(12) United States Patent
Ishak et al.

(10) Patent No.: US 7,556,376 B2
(45) Date of Patent: Jul. 7, 2009

(54) SYSTEM AND METHOD FOR SELECTIVE LIGHT INHIBITION

(75) Inventors: Andrew W. Ishak, Waterford, VT (US); Joshua N. Haddock, Roanoke, VA (US); William Kokonaski, Gig Harbor, WA (US); Ronald Blum, Roanoke, VA (US); Venkatramani S. Iyer, Roanoke, VA (US); Mark M. Mattison-Shupnick, Petaluma, CA (US)

(73) Assignee: High Performance Optics, Inc., Roanoke, VA (US)

( * ) Notice: Subject to any disclaimer, the term of this patent is extended or adjusted under 35 U.S.C. 154(b) by 6 days.

(21) Appl. No.: 11/892,460

(22) Filed: Aug. 23, 2007

(65) Prior Publication Data

US 2008/0094566 A1    Apr. 24, 2008

Related U.S. Application Data

(60) Provisional application No. 60/861,247, filed on Nov. 28, 2006, provisional application No. 60/841,502, filed on Sep. 1, 2006, provisional application No. 60/839,432, filed on Aug. 23, 2006.

(51) Int. Cl.
  *G02C 7/10*  (2006.01)
(52) U.S. Cl. ........................... 351/163; 351/159
(58) Field of Classification Search .................. 351/163, 351/165, 177, 159, 160 R, 160 H, 164; 623/6.17, 623/6.56
See application file for complete search history.

(56) References Cited

U.S. PATENT DOCUMENTS

| | | | |
|---|---|---|---|
| 4,390,676 A | 6/1983 | Loshaek | |
| 4,793,669 A * | 12/1988 | Perilloux | 359/355 |
| 4,878,748 A | 11/1989 | Johansen et al. | |
| 5,172,256 A | 12/1992 | Sethofer et al. | |
| 5,374,663 A | 12/1994 | Daicho et al. | |
| 5,400,175 A | 3/1995 | Johansen et al. | |
| 5,470,932 A | 11/1995 | Jinkerson | |
| 5,528,322 A | 6/1996 | Jinkerson | |
| 5,534,041 A | 7/1996 | Havens et al. | |
| 5,543,504 A | 8/1996 | Jinkerson | |

(Continued)

OTHER PUBLICATIONS

U.S. Appl. No. 11/933,069, Ishak, et al.

(Continued)

*Primary Examiner*—Scott J Sugarman
*Assistant Examiner*—James R Greece
(74) *Attorney, Agent, or Firm*—Ober / Kaler; Royal W. Craig

(57) ABSTRACT

A film suitable for use in an ophthalmic system is provided. The film may selectively inhibit blue light within the wavelength range of 400 nm to 460 nm to reduce phototoxic light to the eye while maintaining photopic vision, and may be color balanced to allow for the system into which the film is incorporated to be perceived as colorless to a viewer observing and/or using the system. The system may have a photopic and scotopic luminous transmission of 85% or more and a phototoxicity ratio of less than 80%. When used in an ophthalmic system or other system disposed between an observer's eye and a light source, the film may reduce the flux of blue light to the internal structures of the eye while reducing or minimizing dilation of the pupil.

26 Claims, 17 Drawing Sheets

U.S. PATENT DOCUMENTS

| | | | |
|---|---|---|---|
| 5,617,154 | A | 4/1997 | Hoffman |
| 5,662,707 | A | 9/1997 | Jinkerson |
| 5,694,240 | A | 12/1997 | Sternbergh |
| 5,702,819 | A | 12/1997 | Gupta et al. |
| 5,729,379 | A | 3/1998 | Allemand et al. |
| 6,021,001 | A | 2/2000 | Turner |
| 6,102,539 | A | 8/2000 | Tucker |
| 6,145,984 | A | 11/2000 | Farwig |
| 6,158,862 | A | 12/2000 | Patel et al. |
| 6,220,703 | B1 | 4/2001 | Evans et al. |
| 6,277,940 | B1 | 8/2001 | Niwa et al. |
| 6,310,215 | B1 | 10/2001 | Iwamoto |
| 6,326,448 | B1 | 12/2001 | Ojio et al. |
| 6,334,680 | B1 | 1/2002 | Larson |
| 6,373,615 | B1 | 4/2002 | Mann et al. |
| 6,411,450 | B1 | 6/2002 | Gatewood et al. |
| 6,444,146 | B2 | 9/2002 | Yoshimura et al. |
| 6,604,824 | B2 | 8/2003 | Larson |
| 6,918,931 | B2 | 7/2005 | Lai et al. |
| 6,926,405 | B2 * | 8/2005 | Ambler et al. ............ 351/163 |
| 6,955,430 | B2 | 10/2005 | Pratt |
| 6,960,231 | B2 | 11/2005 | Tran |
| 6,972,034 | B2 | 12/2005 | Tran et al. |
| 6,984,038 | B2 | 1/2006 | Ishak |
| 6,984,734 | B2 | 1/2006 | Sessler et al. |
| 7,029,118 | B2 | 4/2006 | Ishak |
| 7,029,758 | B2 | 4/2006 | Gallas et al. |
| 7,033,391 | B2 | 4/2006 | Lai et al. |
| 7,066,596 | B2 | 6/2006 | Ishak |
| 7,098,283 | B2 | 8/2006 | Lai |
| 7,241,312 | B2 | 7/2007 | Lai et al. |
| 7,255,435 | B2 | 8/2007 | Pratt |
| 7,276,544 | B2 | 10/2007 | Lai et al. |
| 7,278,737 | B2 | 10/2007 | Mainster et al. |
| 7,279,538 | B2 | 10/2007 | Lai et al. |
| 7,304,117 | B2 | 12/2007 | Lai |
| 2002/0042653 | A1 | 4/2002 | Copeland et al. |
| 2005/0055091 | A1 | 3/2005 | Lai |
| 2005/0143812 | A1 | 6/2005 | Paul et al. |
| 2005/0243272 | A1* | 11/2005 | Mainster et al. ......... 351/160 R |
| 2005/0248752 | A1 | 11/2005 | Hall |
| 2005/0254003 | A1 | 11/2005 | Jani et al. |
| 2005/0273163 | A1 | 12/2005 | Tran et al. |
| 2005/0283234 | A1 | 12/2005 | Zhou et al. |
| 2006/0020338 | A1 | 1/2006 | Lai |
| 2006/0092374 | A1 | 5/2006 | Ishak |
| 2006/0197067 | A1 | 9/2006 | Xia et al. |
| 2006/0241263 | A1 | 10/2006 | Lai |
| 2007/0092831 | A1 | 4/2007 | Lai et al. |
| 2007/0159594 | A9 | 7/2007 | Jani et al. |
| 2007/0216861 | A1 | 9/2007 | Ishak et al. |
| 2008/0002147 | A1 | 1/2008 | Haywood et al. |
| 2008/0013035 | A1 | 1/2008 | Yang et al. |
| 2008/0013045 | A1 | 1/2008 | Mainster et al. |
| 2008/0043200 | A1 | 2/2008 | Ishak et al. |

OTHER PUBLICATIONS

U.S. Appl. No. 12/037,565, Blum, et al.

Infeld, K. "Sunlight Poses Universal Cataract Risk" John Hopkins Study (1998) available at http://www.eurekalert.org/releases/jhu-sunposcat.html, last visited Feb. 1, 2008.

Johnson, W. and Crane, R. "Introduction to Rugate Filter Technology" SPIE vol. 2046, pp. 88-108 (Nov. 1993).

Mainster, M.A. and Sparrow J.R. "How Much Blue Light Should an IOL Transmit?" British Journal of Ophthalmology, 2003, v. 87, pp. 1523-1529.

Wyszecki and Stiles. *Color Science: Concepts and Methods, Quantitative Data and Formulae.* Wiley: New York 1982, pp. 100-107.

Sparrow, J.R. et al. "Blue light-absorbing intraocular lens and retinal pigment epithelium protection in vitro" J. Cataract Refract. Surg. 2004, vol. 30, pp. 873-878.

Kalloniatis, M. and Luu, C. "Psychophysics of Vision" available at http://webvision.med.utah.edu/Phych1.html, last visited Jan. 29, 2008.

M.A. Mainster, "Violet and Blue Light Blocking Intraocular Lenses: Photoprotection vs. Photoreception" Br. J. Ophthalmol, 2006, v. 90, pp. 784-792.

M.A. Mainster, "Intraocular Lenses Should Block UV Radiation and Violet but not Blue Light," Arch. Ophthal., v. 123, p. 550 (2005).

* cited by examiner

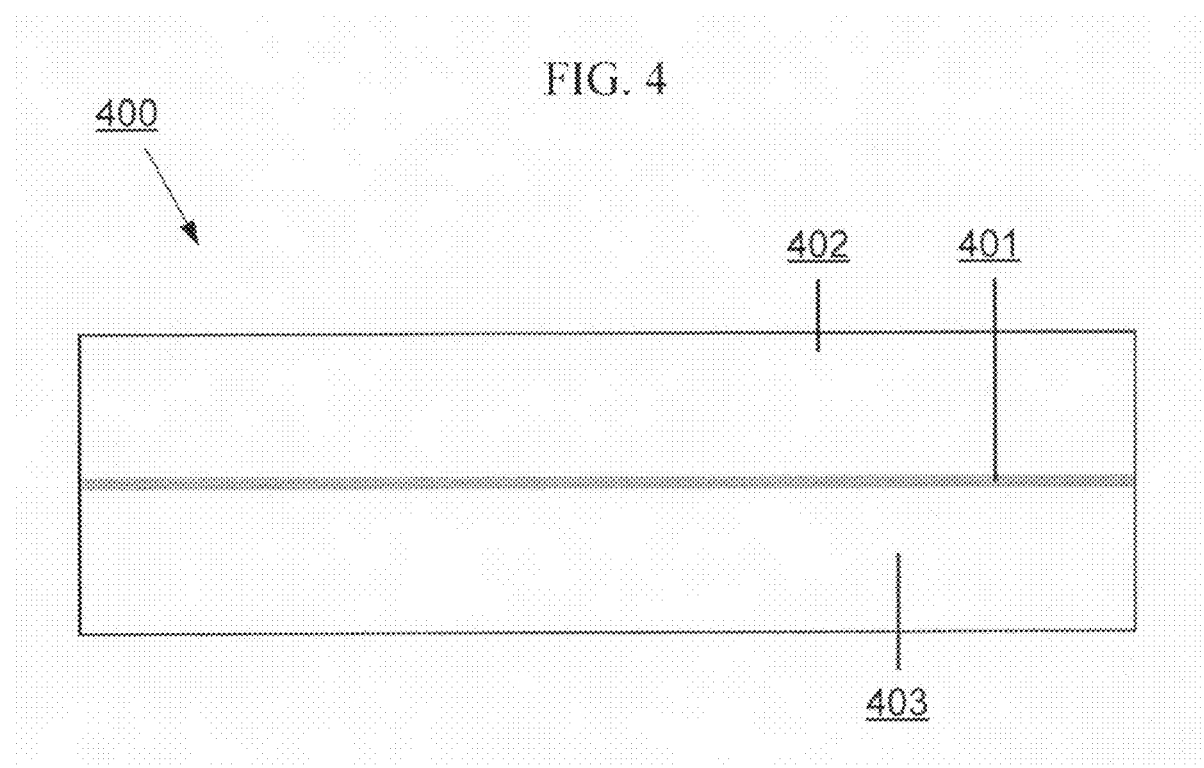

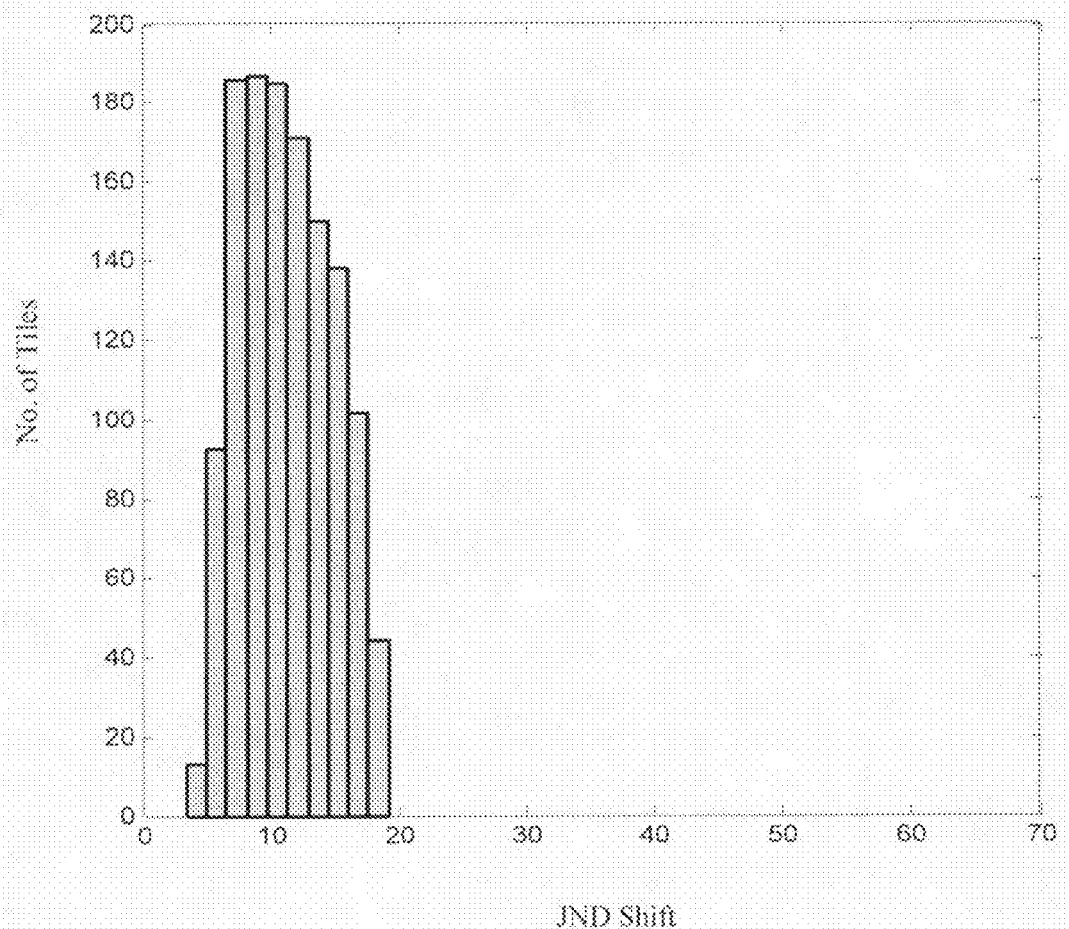

FIG. 17
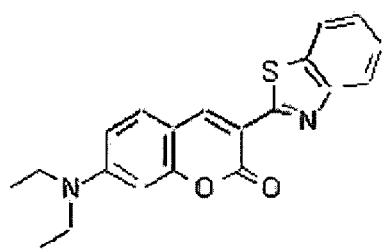
Coumarin 6
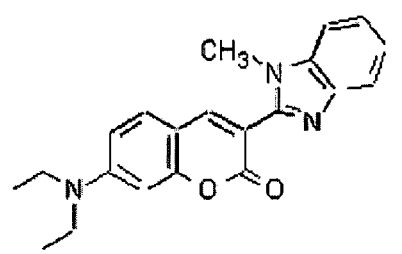
Coumarin 30
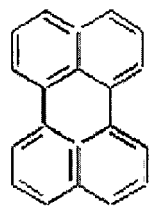
Perylene
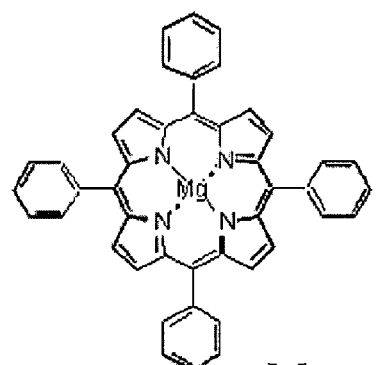
Magnesium Tetraphenyl Porphyrin
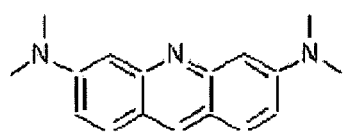
Yellow Orange
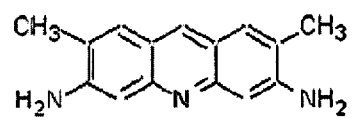
Acridyne Acridyne

SYSTEM AND METHOD FOR SELECTIVE LIGHT INHIBITION

RELATED APPLICATIONS

This application claims the benefit of U.S. Provisional Application No. 60/839,432, filed Aug. 23, 2006, U.S. Provisional Application No. 60/841,502, filed Sep. 1, 2006, and U.S. Provisional Application No. 60/861,247, filed Nov. 28, 2006, each of which is incorporated herein by reference in its entirety.

BACKGROUND

Cataracts and macular degeneration are widely thought to result from photochemical damage to the intraocular lens and retina, respectively. Blue light exposure has also been shown to accelerate proliferation of uveal melanoma cells. The most energetic photons in the visible spectrum have wavelengths between 380 and 500 nm and are perceived as violet or blue. The wavelength dependence of phototoxicity summed over all mechanisms is often represented as an action spectrum, such as is described in Mainster and Sparrow, "How Much Blue Light Should an IOL Transmit?" Br. J. Opthalmol., 2003, v. 87, pp. 1523-29 and FIG. 6. In eyes without an intraocular lens (aphakic eyes), light with wavelengths shorter than 400 nm can cause damage. In phakic eyes, this light is absorbed by the intraocular lens and therefore does not contribute to retinal phototoxicity, however it can cause optical degradation of the lens or cataracts.

The pupil of the eye responds to the photopic retinal illuminance, in trolands, which is the product of the incident flux with the wavelength-dependent sensitivity of the retina and the projected area of the pupil. This sensitivity is described in Wyszecki and Stiles, *Color Science: Concepts and Methods Quantitative Data and Formulae* (Wiley: N.Y.) 1982, esp. pages 102-107.

Current research indicates that over the course of one's life, beginning with that of an infant, metabolic waste byproducts accumulate within the pigment epithelium layer of the retina, due to light interactions with the retina. This metabolic waste product is characterized by certain fluorophores; one of the most prominent being lipofuscin constituent A2E. It has been shown that this particular fluorophore is excited most significantly by blue light radiation of the wavelength of about 430 nanometers. It is theorized that a tipping point is reached when a combination of a build-up of this metabolic waste (specifically the lipofuscin fluorophore) has achieved a certain level of accumulation, the human body's physiological ability to metabolize within the retina certain of this waste has diminished as one reaches a certain age threshold, and a blue light stimulus of the proper wavelength causes drusen to be formed. It is believed that the drusen then further interfere with the normal physiology/metabolic activity which allows for the proper nutrients to get to the photoreceptors thus contributing to AMD (age related macular degeneration). AMD is believed to be the leading cause of blindness in the elderly.

From a theoretical perspective, the following appears to take place:

1) Waste buildup occurs within the pigment epithelial level starting from infancy through out life.
2) Retinal metabolic activity and ability to deal with this waste typically diminish with age.
3) The macula pigment typically decreases as one ages, thus filtering out less blue light.
4) Blue light causes the lipofuscin to become toxic.
5) The resulting toxicity damages pigment epithelial cells.

It has been shown that if about 50% of the blue light within the wavelength range of 430±30 nm is blocked, cell death caused by the blue light may be reduced by up to 80%. External eyewear such as sunglasses, spectacles, goggles, and contact lenses that block blue light in an attempt to improve eye health are disclosed, for example, in U.S. Pat. No. 6,955,430 to Pratt. Other ophthalmic devices whose object is to protect the retina from this phototoxic light include intraocular and contact lenses. These ophthalmic devices are positioned in the optical path between environmental light and the retina and generally contain or are coated with dyes that selectively absorb blue and violet light.

Other lenses are known that attempt to decrease chromatic aberration by blocking blue light. Chromatic aberration is caused by optical dispersion of ocular media including the cornea, intraocular lens, aqueous humour, and vitreous humour. This dispersion focuses blue light at a different image plane than light at longer wavelengths, leading to defocus of the full color image. Conventional blue blocking lenses are described in U.S. Pat. No. 6,158,862 to Patel et al., U.S. Pat. No. 5,662,707 to Jinkerson, U.S. Pat. No. 5,400,175 to Johansen, and U.S. Pat. No. 4,878,748 to Johansen.

Conventional methods for reducing blue light exposure of ocular media typically completely occlude light below a threshold wavelength, while also reducing light exposure at longer wavelengths. For example, the lenses described in U.S. Pat. No. 6,955,430 to Pratt transmit less than 40% of the incident light at wavelengths as long as 650 nm, as shown in FIG. 6 of Pratt '430. The blue-light blocking lens disclosed by Johansen and Diffendaffer in U.S. Pat. No. 5,400,175 similarly attenuates light by more than 60% throughout the visible spectrum, as illustrated in FIG. 3 of the '175 patent.

Balancing the range and amount of blocked blue light may be difficult, as blocking and/or inhibiting blue light affects color balance, color vision if one looks through the optical device, and the color in which the optical device is perceived. For example, shooting glasses appear bright yellow and block blue light. The shooting glasses often cause certain colors to become more apparent when one is looking into a blue sky, allowing for the shooter to see the object being targeted sooner and more accurately. While this works well for shooting glasses, it would be unacceptable for many ophthalmic applications.

It has been found that conventional blue-blocking reduces visible transmission, which in turn stimulates dilation of the pupil. Dilation of the pupil increases the flux of light to the internal eye structures including the intraocular lens and retina. Since the radiant flux to these structures increases as the square of the pupil diameter, a lens that blocks half of the blue light but, with reduced visible transmission, relaxes the pupil from 2 mm to 3 mm diameter, will actually increase the dose of blue photons to the retina by 12.5%. Protection of the retina from phototoxic light depends on the amount of this light that impinges on the retina, which depends on the transmission properties of the ocular media and also on the dynamic aperture of the pupil. Previous work to date has been silent on the contribution of the pupil to prophylaxis of phototoxic blue light.

Another problem with conventional blue-blocking is that it can degrade night vision. Blue light is more important for low-light level or scotopic vision than for bright light or photopic vision, a result which is expressed quantitatively in the luminous sensitivity spectra for scotopic and photopic vision. Photochemical and oxidative reactions cause the absorption of 400 to 450 nm light by intraocular lens tissue to increase naturally with age. Although the number of rod photoreceptors on the retina that are responsible for low-light vision also decreases with age, the increased absorption by the intraocular lens is important to degrading night vision. For example, scotopic visual sensitivity is reduced by 33% in a 53 year-old intraocular lens and 75% in a 75 year-old lens. The tension between retinal protection and scotopic sensitivity is further described in Mainster and Sparrow, "How Much Light Should and IOL Transmit?", Br. J. Opthalmol., 2003, v. 87, pp. 1523-29.

Conventional approaches to blue blocking also may include cutoff or high-pass filters to reduce the transmission below a specified blue or violet wavelength to zero. For example, all light below a threshold wavelength may be blocked completely or almost completely. For example, U.S. Pub. Patent Application No. 2005/0243272 to Mainster and Mainster, "Intraocular Lenses Should Block UV Radiation and Violet but not Blue Light," Arch. Ophthal., v. 123, p. 550 (2005) describe the blocking of all light below a threshold wavelength between 400 and 450 nm. Such blocking may be undesirable, since as the edge of the long-pass filter is shifted to longer wavelengths, dilation of the pupil acts to increase the total flux. As previously described, this can degrade scotopic sensitivity and increase color distortion.

SUMMARY OF THE INVENTION

A film is provided that can be included within or on a wide variety of systems to block and/or selectively inhibit blue light wavelengths without causing an unacceptable color shift. Such devices may include windows, automotive windshields, lenses, including ophthalmic lenses such as spectacle lenses, contact lenses, intraocular lenses, and electroactive lenses, corneal inlays, special filters that can be applied to camera flashes, fluorescent lighting, LED lighting, other forms of artificial lighting (either to the lighting filament enclosure or the fixture itself), ophthalmic instrumentation such as a retinascope, opthalmoscope, fundus camera, biomicroscope and other forms of instrumentation used to view the human eye, computer monitors, television screens, lighted signs and any other item whereby blue light is emitted or transmitted. When included within a lens, the film may provide for even coloration or lack of most or all coloration of most or all of the spectacle lens.

The film may block and/or selectively inhibit at least 5%, at least 10%, at least 20%, at least 30%, at least 40%, and/or at least 50% of blue light within the wavelength range of 380 to 500 nm, and may be color balanced to allow for perception of the film and a system into which the film is incorporated as colorless to a viewer observing the film or system. Systems incorporating a film according to the present invention also may have a photopic luminous transmission of 85% or more of all visible light, and allow a user and/or observer of a system incorporating the film to have mostly normal color vision through the system.

Devices and systems described herein may reduce the flux of blue light to the internal structures of the eye while reducing or minimizing the dilation of the pupil that results from reducing luminous transmission. Methods and systems described herein also may reduce, minimize, or eliminate, color distortion in lenses that perform blue blocking. Specific devices may protect retinal health with a substantially colorless lens that, when viewed on the face of a person wearing the lens, does not cause a cosmetically distracting color shift.

Devices and systems described herein also may protect the human retina from phototoxic blue light by preventing dilation of the pupil which acts to increase blue and other photon flux to the macula. Absorptive, reflective, or hybrid absorptive and reflective optical filter elements within and/or external to the eye may block some, but not all, blue light from the eye's image plane. By allowing some blue light to reach the retinal plane, devices and methods described herein may maintain sensitivity in low light levels (scotopic or night vision), reduce color distortion caused by blue-filtering, and reduce cosmetically undesirable tints of the wearer's face when it is viewed through the blue-filtering device.

BRIEF DESCRIPTION OF THE DRAWINGS

FIG. 4 shows an exemplary system according to the present invention.

FIG. 13 shows a histogram summarizing color distortion of a device according to the present invention for Munsell tiles in daylight.

FIG. 17 shows exemplary dyes according to the present invention.

DETAILED DESCRIPTION

According to the invention, a film in an ophthalmic or other system may selectively inhibit at least 5%, at least 10%, at least 20%, at least 30%, at least 40%, and/or at least 50% of blue light within the 400 nm-460 nm range. As used herein, a film "selectively inhibits" a wavelength range if it inhibits at least some transmission within the range, while having little or no effect on transmission of visible wavelengths outside the range. The film and/or a system incorporating the film may be color balanced to allow for being perception by an observer and/or user as colorless. Systems incorporating a film according to the present invention may have a scotopic luminous transmission of 85% or better of visible light, and further allow someone looking through the film or system to have mostly normal color vision.

Figure 1:
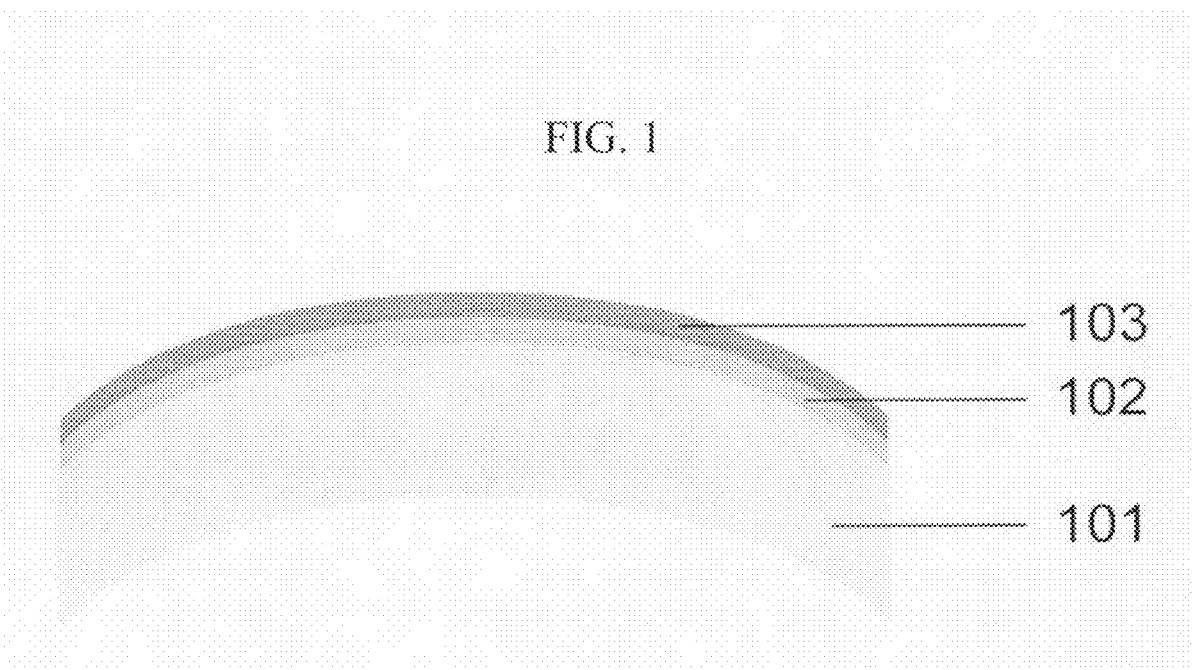
FIG. 1 shows an ophthalmic device according to the present invention.

FIG. 1 shows an exemplary embodiment of the present invention. A film 102 may be disposed between two layers or regions of one or more base materials 101, 103. As further described herein, the film may contain a dye that selectively inhibits certain wavelengths of light. The base material or materials may be any material suitable for a lens, ophthalmic system, window, or other system in which the film may be disposed.

Figure 2:
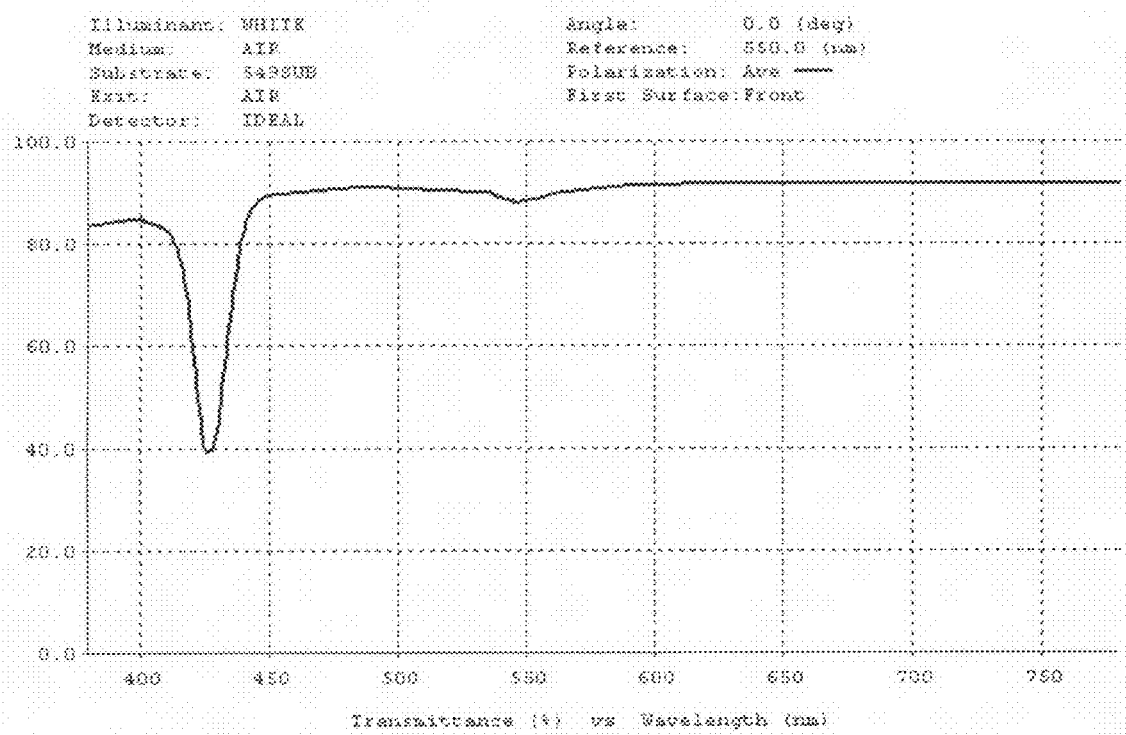
FIG. 2 shows the optical transmission characteristic of an exemplary film according to the present invention.

The optical transmission characteristic of an exemplary film according to the invention is shown in FIG. 2 where about 50% of blue light in the range of 430 nm±10 nm is blocked, while imparting minimal losses on other wavelengths within the visible spectrum. The transmission shown in FIG. 2 is exemplary, and it will be understood that for many applications it may be desirable to selectively inhibit less than 50% of blue light, and/or the specific wavelengths inhibited may vary. It is believed that in many applications cell death may be reduced or prevented by blocking less than 50% of blue light. For example, it may be preferred to selectively inhibit about 40%, more preferably about 30%, more preferably about 20%, more preferably about 10%, and more preferably about 5% of light in the 400-460 nm range. Selectively inhibiting a smaller amount of light may allow for prevention of damage due to high-energy light, while being minimal enough that the inhibition does not adversely affect scotopic vision and/or circadian cycles in a user of the system.

Figure 3:
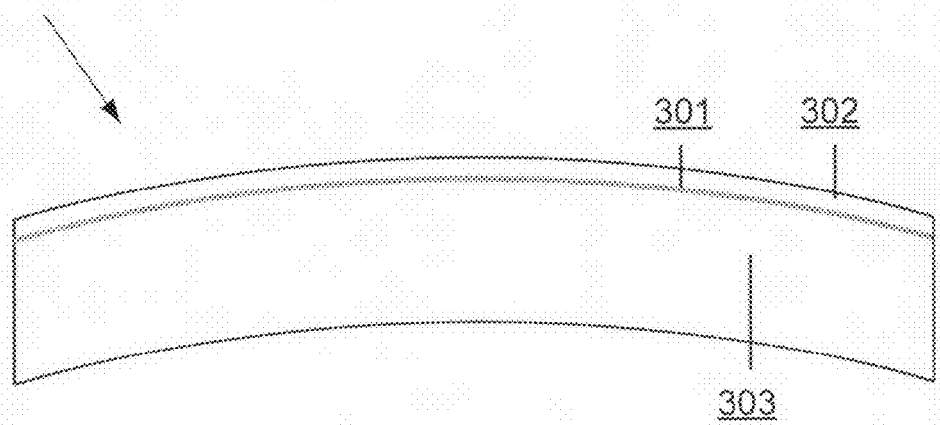
FIG. 3 shows an exemplary ophthalmic system according to the present invention.

FIG. 3 shows a film 301 incorporated into an ophthalmic lens 300 according to the present invention, where it is sandwiched between layers of ophthalmic material 302, 303. The thickness of the front layer of ophthalmic material is, by way of example only, in the range of 200 microns to 1,000 microns.

Similarly, FIG. 4 shows an exemplary system 400, such as an automotive windshield, according to the present invention. A film 401 may be incorporated into the system 400, where it is sandwiched between layers of base material 402, 403. For example, where the system 400 is an automotive windshield, the base material 402, 403 may be windshield glass as is commonly used. It will be understood that in various other systems, including visual, display, ophthalmic, and other systems, different base materials may be used without departing from the scope of the present invention.

In an embodiment, a system according to the invention may be operated in an environment where the relevant emitted visible light has a very specific spectrum. In such a regime, it may be desirable to tailor a film's filtering effect to optimize the light transmitted, reflected, or emitted by the item. This may be the case, for example, where the color of the transmitted, reflected, or emitted light is of primary concern. For example, when a film according to the present invention is used in or with a camera flash or flash filter, it may be desirable for the perceived color of the image or print to be as close to true color as possible. As another example, a film according to the present invention may be used in instrumentation for observing the back of a patient's eye for disease. In such a system, it may be important for the film not to interfere with the true and observed color of the retina. As another example, certain forms of artificial lighting may benefit from a wavelength-customized filter utilizing the inventive film.

In an embodiment, the inventive film may be utilized within a photochromic, electro-chromic, or changeable tint ophthalmic lens, window or automotive windshield. Such a system may allow for protection from UV light wavelengths, direct sunlight intensity, and blue light wavelengths in an environment where the tinting is not active. In this embodiment the film's blue light wavelengths protective attributes may be effective regardless of whether the tinting is active.

In an embodiment, a film may allow for selective inhibition of blue light while being color balanced and will have an 85% or greater scotopic luminous transmission of visible light. Such a film may be useful for lower light transmission uses such as driving glasses or sport glasses, and may provide increased visual performance due to increased contrast sensitivity.

For some applications, it may be desirable for a system according to the present invention to selectively inhibit blue light as described herein, and have a luminous transmission of less than about 85%, typically about 80-85%, across the visible spectrum. This may be the case where, for example, a base material used in the system inhibits more light across all visible wavelengths due to its higher index of refraction. As a specific example, high index (e.g., 1.7) lenses may reflect more light across wavelengths leading to a luminous transmission less than 85%.

To avoid, reduce, or eliminate problems present in conventional blue-blocking systems, it may be desirable to reduce, but not eliminate, transmission of phototoxic blue light. The pupil of the eye responds to the photopic retinal illuminance, in trolands, which is the product of the incident flux with the wavelength-dependent sensitivity of the retina and the projected area of the pupil. A filter placed in front of the retina, whether within the eye, as in an intraocular lens, attached to the eye, as in a contact lens or corneal replacement, or otherwise in the optical path of the eye as in a spectacle lens, may reduce the total flux of light to the retina and stimulate dilation of the pupil, and thus compensate for the reduction in field illuminance. When exposed to a steady luminance in the field the pupil diameter generally fluctuates about a value that increases as the luminance falls.

Figure 5A:
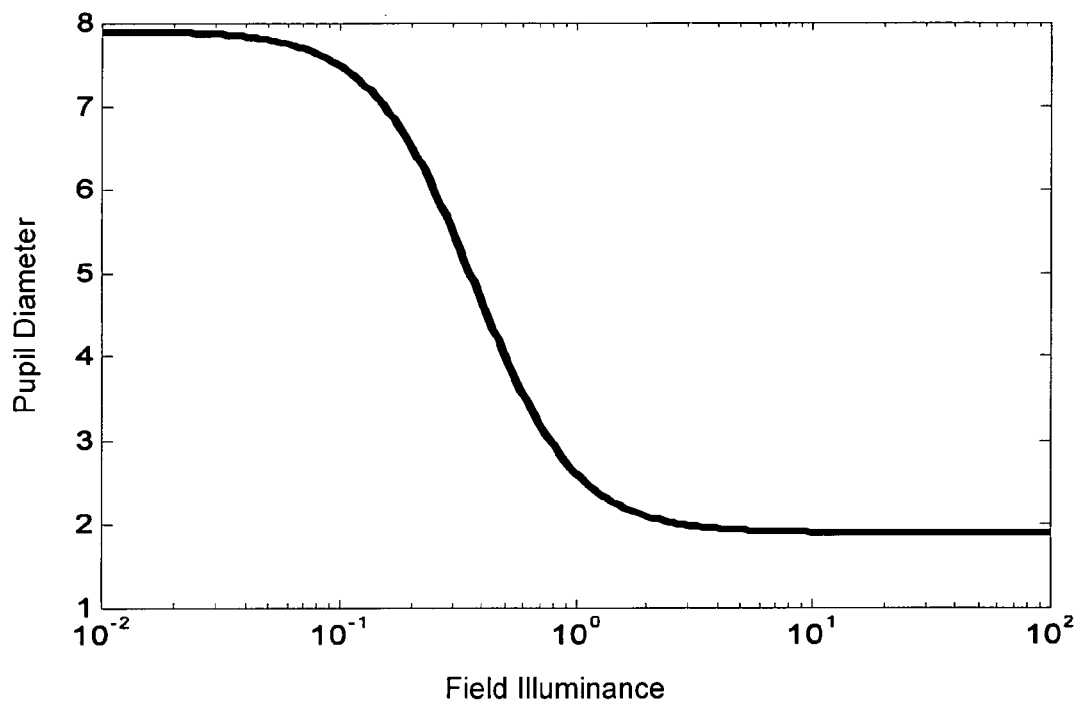
FIG. 5A shows pupil diameter as a function of field illuminance.
Figure 5B:
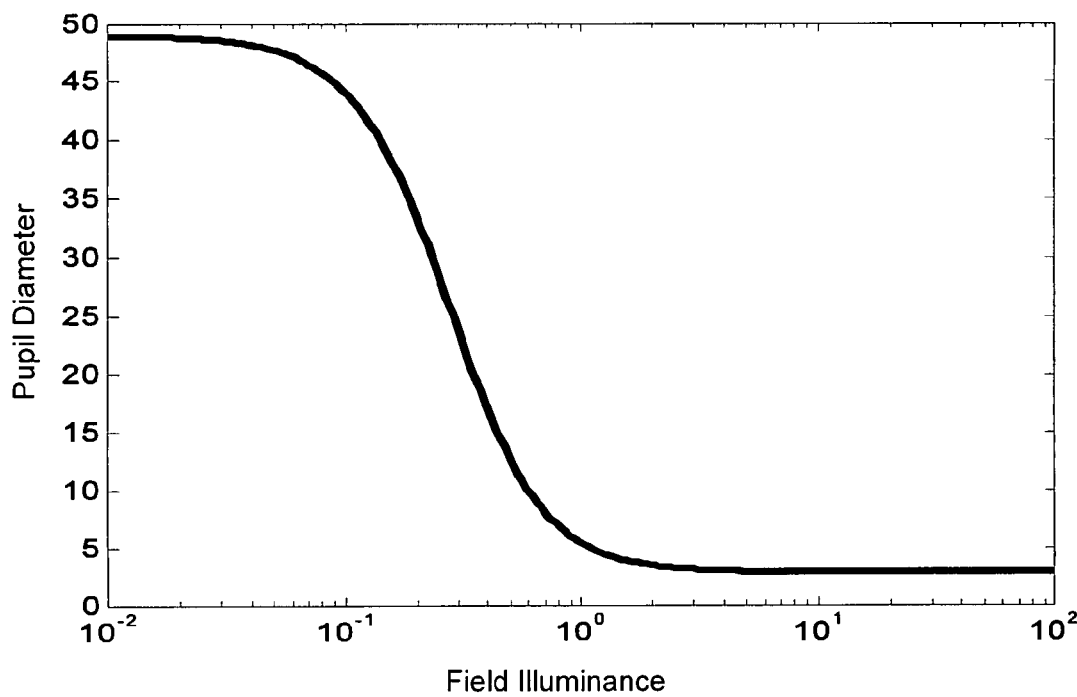
FIG. 5B shows pupil area as a function of field illuminance.

A functional relationship between pupil area and field illuminance described by Moon and Spencer, J. Opt. Soc. Am. v. 33, p. 260 (1944) using the following equation for pupil diameter:

$$d = 4.9 - 3 \tan h(\text{Log}(L) + 1) \tag{0.1}$$

where d is in millimeters and L is the illuminance in cd/m². FIG. 5A shows pupil diameter (mm) as a function of field illuminance (cd/m²). FIG. 5B shows pupil area (mm²) as a function of field illuminance.

The illuminance is defined by the international CIE standards as a spectrally weighted integration of visual sensitivity over wavelength:

$$L = K_m \int L_{e,\lambda} V_\lambda d\lambda \text{ photopic}$$

$$L' = K_m' \int L_{e,\lambda} V'_\lambda d\lambda \text{ scotopic} \tag{0.2}$$

where $K_m'$ is equal to 1700.06 lm/W for scotopic (night) vision, $K_m$=683.2 lm/W for photopic (day) vision and the spectral luminous efficiency functions $V_\lambda$ and $V_\lambda'$ define the standard photopic and scotopic observers. The luminous efficiency functions $V_\lambda$ and $V_\lambda'$ are illustrated in, e.g., FIG. 9 of Michael Kalloniatis and Charles Luu, "Psychophysics of Vision," available at http://webvision.med.utah.edu/Phych1.html, last visited Aug. 8, 2007, which is incorporated by reference herein.

Interposition of an absorptive ophthalmic element in the form of an intraocular, contact, or spectacle lens reduces the illuminance according to the formula:

$$L = K_m \int T_\lambda L_{e,\lambda} V_\lambda d\lambda \text{ photopic}$$

$$L' = K_m' \int T_\lambda L_{e,\lambda} V_\lambda' d\lambda \text{ scotopic} \quad (0.3)$$

where $T_\lambda$ is the wavelength-dependent transmission of the optical element. Values for the integrals in equation 1.3 normalized to the unfiltered illuminance values computed from equation 1.2 for each of the prior-art blue blocking lenses are shown in Table I.

TABLE I

| Reference | Figure | Photopic Ratio | Scotopic Ratio |
|---|---|---|---|
| Unfiltered | | 1.000 | 1.000 |
| Pratt '430 | | 0.280 | 0.164 |
| Mainster 2005/0243272 | | 0.850 | 0.775 |
| Present System | 6 | 0.996 | 0.968 |
| Present System | 7 (solid line) | 0.993 | 0.947 |
| Present System | 8 | 0.978 | 0.951 |

Referring to Table I, the ophthalmic filter according to Pratt reduces scotopic sensitivity by 83.6% of its unfiltered value, an attenuation that will both degrade night vision and stimulate pupil dilation according to equation 1.1. The device described by Mainster reduces scotopic flux by 22.5%, which is less severe than the Pratt device but still significant.

In contrast, a film according to the present invention partially attenuates violet and blue light using absorptive or reflective ophthalmic elements while reducing the scotopic illuminance by no more than 15% of its unfiltered value. Surprisingly, systems according to the present invention were found to selectively inhibit a desired region of blue light, while having little to no effect on photopic and scotopic vision.

Figure 6:
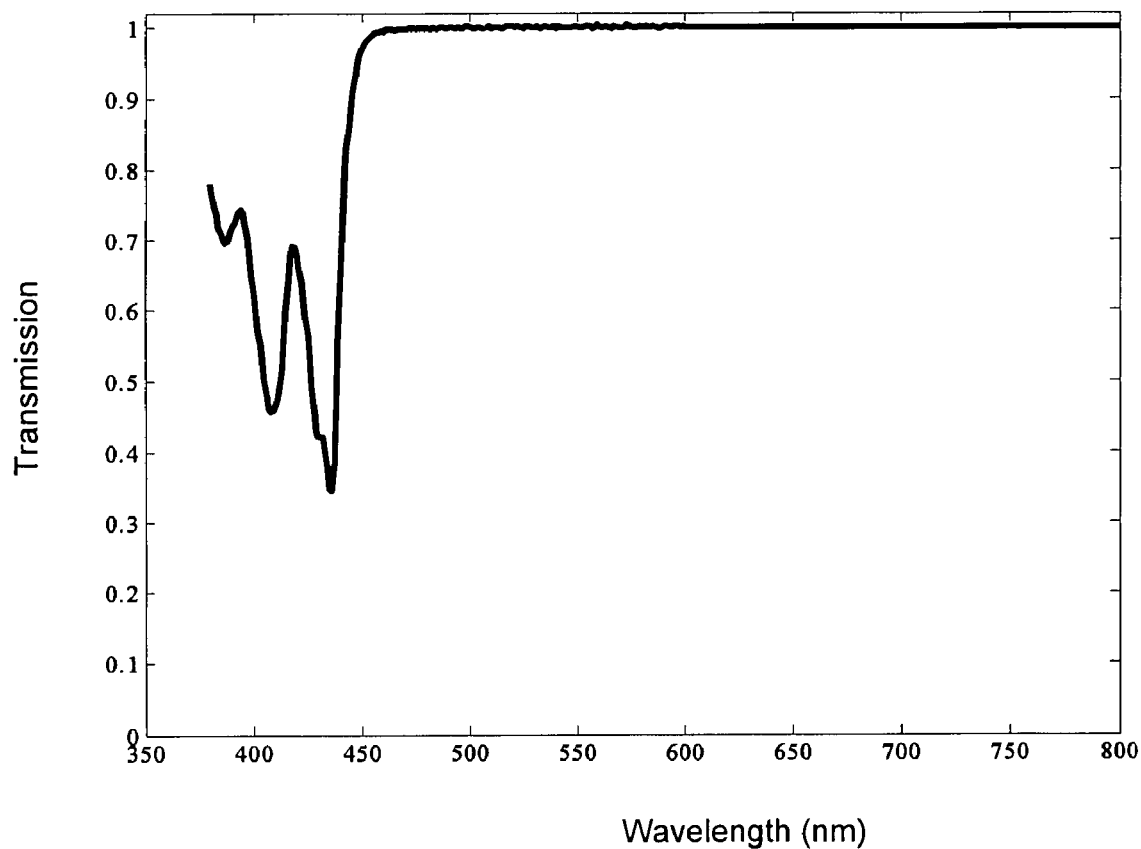
FIG. 6 shows the transmission spectrum of a film according to the present invention that is doped with perylene dye where the product of concentration and path length yield about 33% transmission at about 437 nm.
Figure 7:
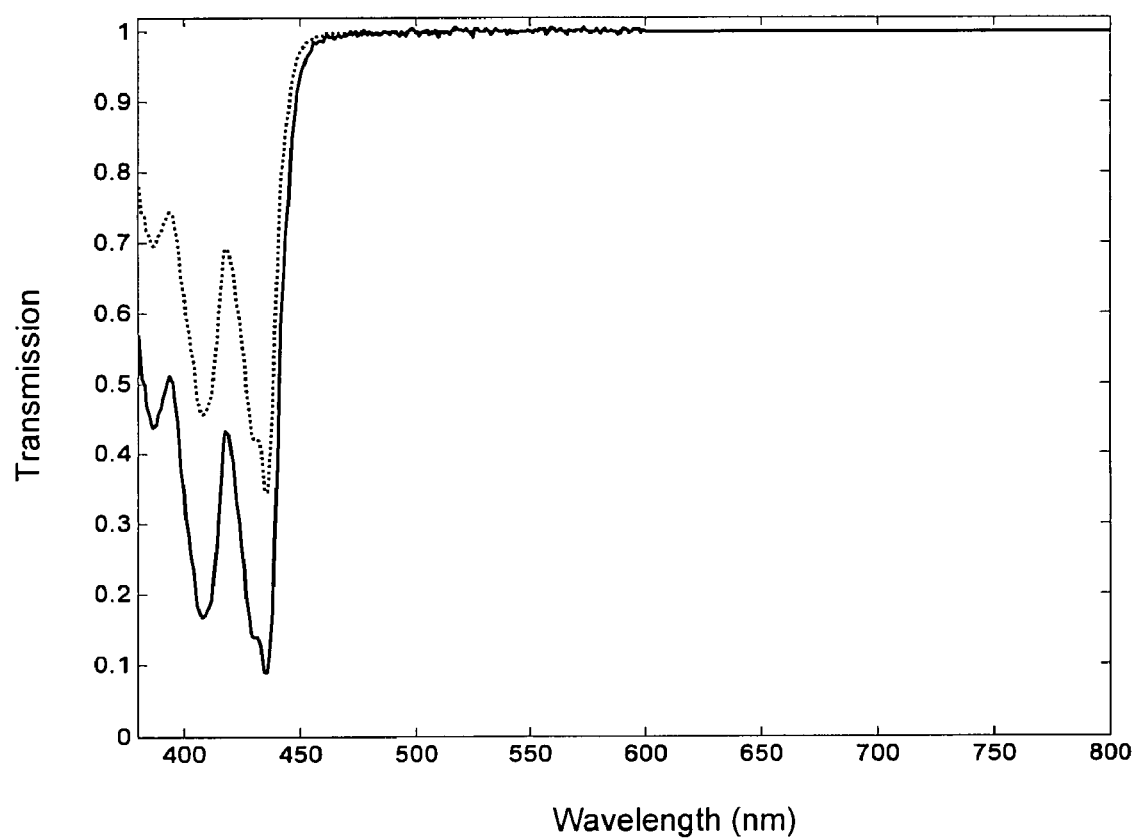
FIG. 7 shows the transmission spectrum of a film according to the present invention with a perylene concentration about 2.27 times higher than that illustrated in FIG. 6.

In an embodiment, perylene ($C_{20}H_{12}$, CAS # 198-55-0) is incorporated into an ophthalmic device at a concentration and thickness sufficient to absorb about two thirds of the light at its absorption maximum of 437 nm. The transmission spectrum of this device is shown in FIG. 6. The change in illuminance that results from this filter is only about 3.2% for scotopic viewing conditions and about 0.4% under photopic viewing conditions, as displayed in Table I. Increasing the concentration or thickness of perylene in the device decreases the transmission at each wavelength according to Beer's law. FIG. 7 shows the transmission spectrum of a device with a perylene concentration 2.27 times higher than that for FIG. 6. Although this device selectively blocks more of the phototoxic blue light than the device in FIG. 6, it reduces scotopic illuminance by less than 6% and photopic illuminance by less than 0.7%. Note that reflection has been removed from the spectra in FIGS. 6 and 7 to show only the effect of absorption by the dye.

Dyes other than perylene may have strong absorption in blue or roughly blue wavelength ranges and little or no absorbance in other regions of the visible spectrum. Examples of such dyes, illustrated in FIG. 17, include porphyrin, coumarin, and acridine based molecules which may be used singly or in combination to give transmission that is reduced, but not eliminated, at 400 nm-460 mm. The methods and systems described herein therefore may use similar dyes based on other molecular structures at concentrations that mimic the transmission spectra of perylene, porphyrin, coumarin, and acridine.

The insertion of dye into the optical path according to embodiments of the present invention may be accomplished by diverse methods familiar to those practiced in the art of optical manufacturing. The dye or dyes may be incorporated directly into the substrate, added to a polymeric coating, imbibed into the lens, incorporated in a laminated structure that includes a dye-impregnated layer, or as a composite material with dye-impregnated microparticles.

Figure 8:
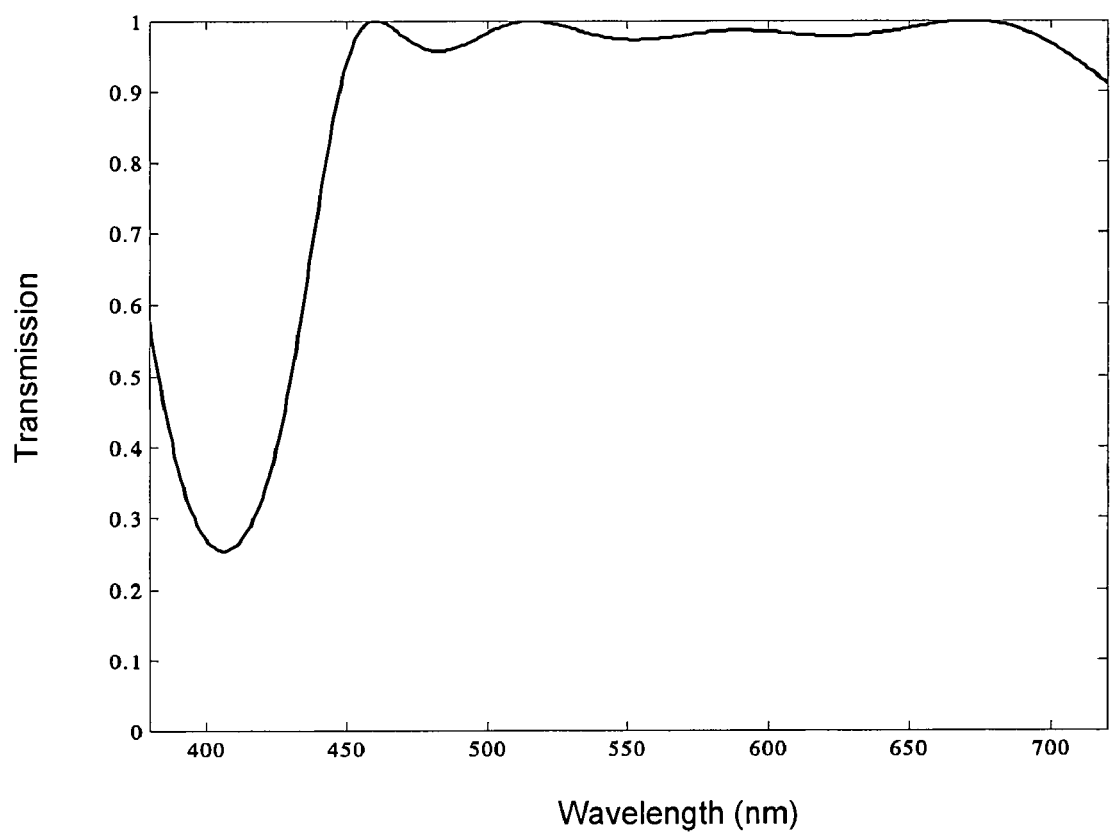
FIG. 8 shows an exemplary transmission spectrum for a six-layer stack of $SiO_2$ and $ZrO_2$ according to the present invention.

According to another embodiment of the invention a dielectric coating that is partially reflective in the violet and blue spectral regions and antireflective at longer wavelengths may be applied. Methods for designing appropriate dielectric optical filters are summarized in textbooks such as Angus McLeod, *Thin Film Optical Filters* (McGraw-Hill:NY) 1989. An exemplary transmission spectrum for a six-layer stack of $SiO_2$ and $ZrO_2$ according to the present invention is shown in FIG. 8. Referring again to Table I, it is seen that this optical filter blocks phototoxic blue and violet light while reducing scotopic illuminance by less than 5% and photopic illuminance by less than 3%.

Although many conventional blue blocking technologies attempt to inhibit as much blue light as possible, current research suggests that in many applications it may be desirable to inhibit a relatively small amount of blue light. For example, to prevent undesirable effects on scotopic vision, it may be desirable for an ophthalmic system according to the invention to inhibit only about 30% of blue (i.e., 380-500 nm) wavelength light, or more preferably only about 20% of blue light, more preferably about 10%, and more preferably about 5%. It is believed that cell death may be reduced by inhibiting as little as 5% of blue light, while this degree of blue light reduction has little or no effect on scotopic vision and/or circadian behavior of those using the system.

As used herein, a film according to the invention that selectively inhibits blue light is described as inhibiting an amount of light measured relative to the base system incorporating the film. For example, an ophthalmic system may use a polycarbonate or other similar base for a lens. Materials typically used for such a base may inhibit a various amount of light at visible wavelengths. If a blue-blocking film according to the present invention is added to the system, it may selectively inhibit 5%, 10%, 20%, 30%, 40%, and/or 50% of all blue wavelengths, as measured relative to the amount of light that would be transmitted at the same wavelength(s) in the absence of the film.

The methods and devices disclosed herein may minimize, and preferably eliminate, the shift in color perception that results from blue-blocking. The color perceived by the human visual system results from neural processing of light signals that fall on retinal pigments with different spectral response characteristics. To describe color perception mathematically, a color space is constructed by integrating the product of three wavelength-dependent color matching functions with the spectral irradiance. The result is three numbers that characterize the perceived color. A uniform (L*, a*, b*) color space, which has been established by the Commission Internationale de L'eclairage (CIE), may be used to characterize perceived colors, although similar calculations based on alternative color standards are familiar to those practiced in the art of color science and may also be used. The (L*, a*, b*) color space defines brightness on the L* axis and color within the plane defined by the a* and b* axes. A uniform color space such as that defined by this CIE standard may be preferred for computational and comparative applications, since the Cartesian distances of the space are proportional to the magnitude of perceived color difference between two objects. The use of uniform color spaces generally is recognized in the art, such as described in Wyszecki and Stiles, *Color Science: Concepts and Methods, Quantitative Data and Formulae* (Wiley: N.Y.) 1982.

Figure 9:
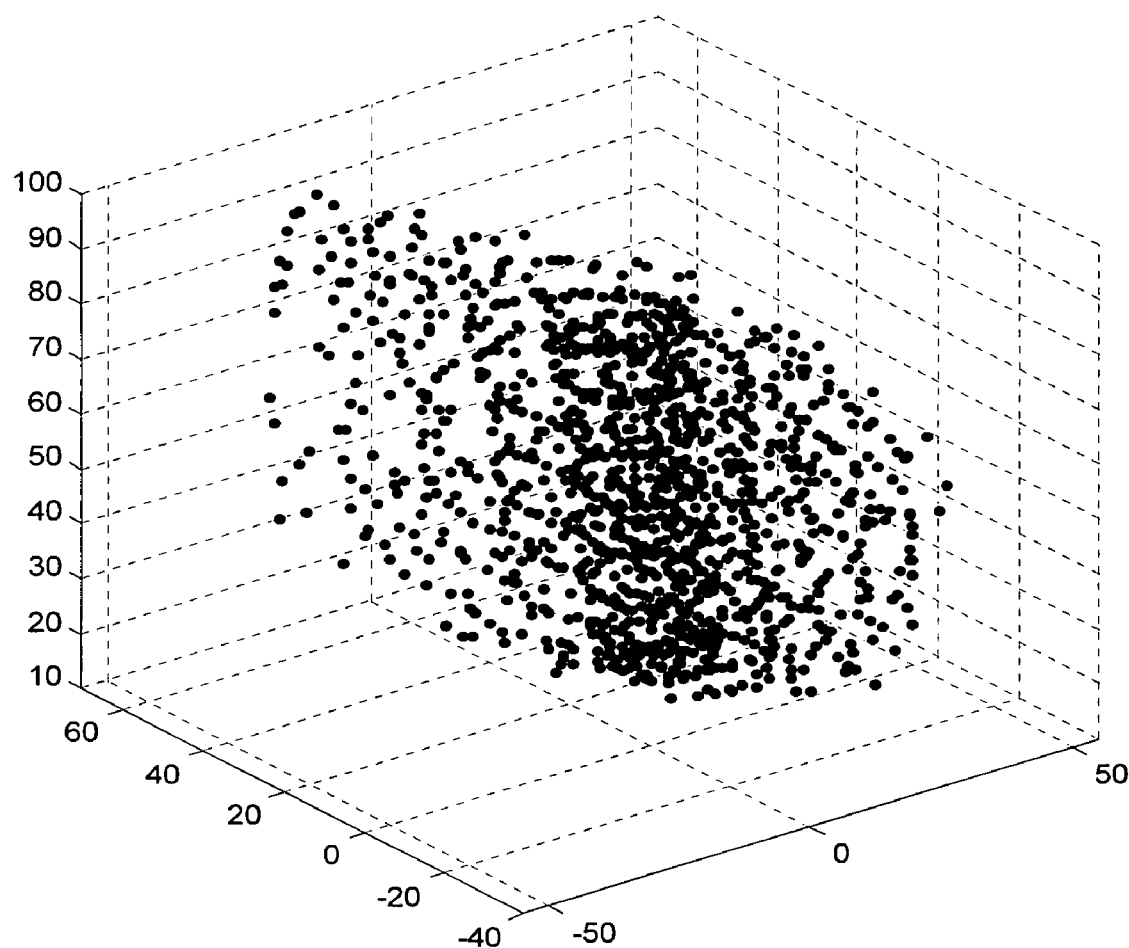
FIG. 9 shows reference color coordinates corresponding to Munsell tiles illuminated by a prescribed illuminant in (L*, a*, b*) color space.
Figure 10A:
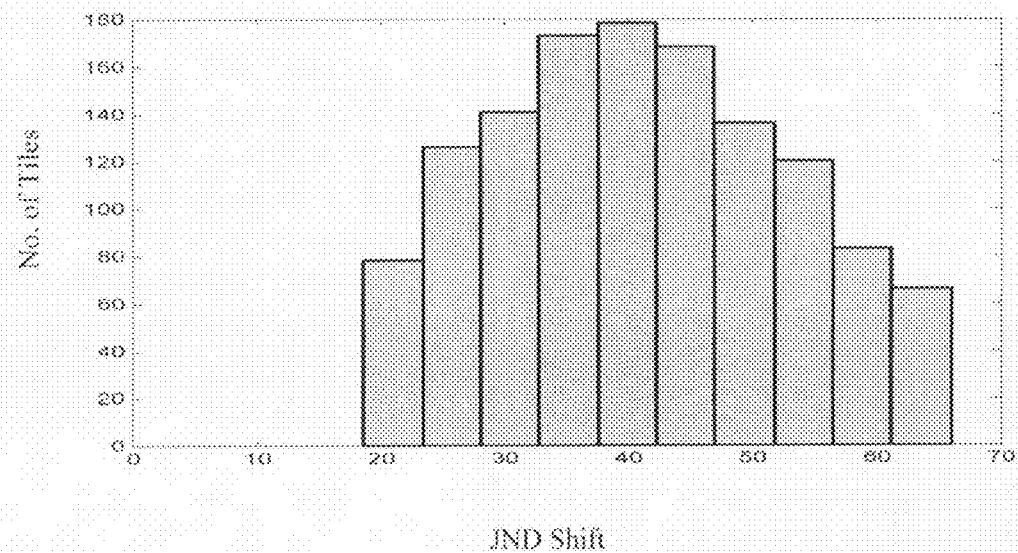
FIG. 10A shows a histogram of the color shifts for Munsell color tiles for a related filter.

An optical design according to the methods and systems described herein may use a palette of spectra that describe the visual environment. A non-limiting example of this is the Munsell matte color palette, which is comprised of 1,269 color tiles that have been established by psychophysical experiments to be just noticeably different from each other. The spectral irradiance of these tiles is measured under standard illumination conditions. The array of color coordinates corresponding to each of these tiles illuminated by a D65 daylight illuminant in (L*, a*, b*) color space is the reference for color distortion and is shown in FIG. 9. The spectral irradiance of the color tiles is then modulated by a blue-blocking filter and a new set of color coordinates is computed. Each tile has a perceived color that is shifted by an amount corresponding to the geometric displacement of the (L*, a*, b*) coordinates. This calculation has been applied to the blue-blocking filter of Pratt, where the average color distortion is 41 just noticeable difference (JND) units in (L*, a*, b*) space. The minimum distortion caused by the Pratt filter is 19 JNDs, the maximum is 66, and the standard deviation is 7 JNDs. A histogram of the color shifts for all 1,269 color tiles is shown in FIG. 10A (top).

Figure 10B:
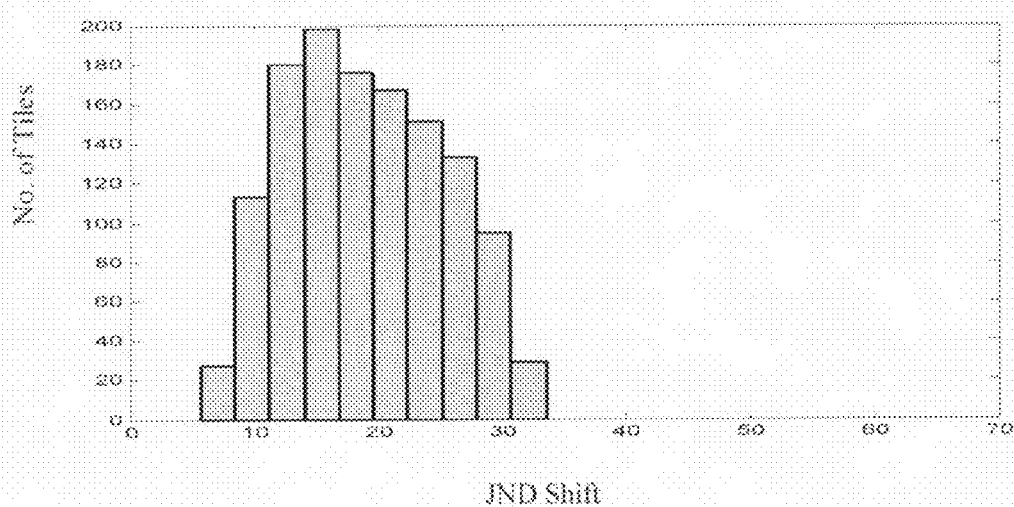
FIG. 10B shows a color shift induced by a related blue-blocking filter.

Referring now to FIG. 10B, the color shift induced by the Mainster blue-blocking filter has a minimum value of 6, an average of 19, a maximum of 34, and a standard deviation of 6 JNDs.

Figure 11:
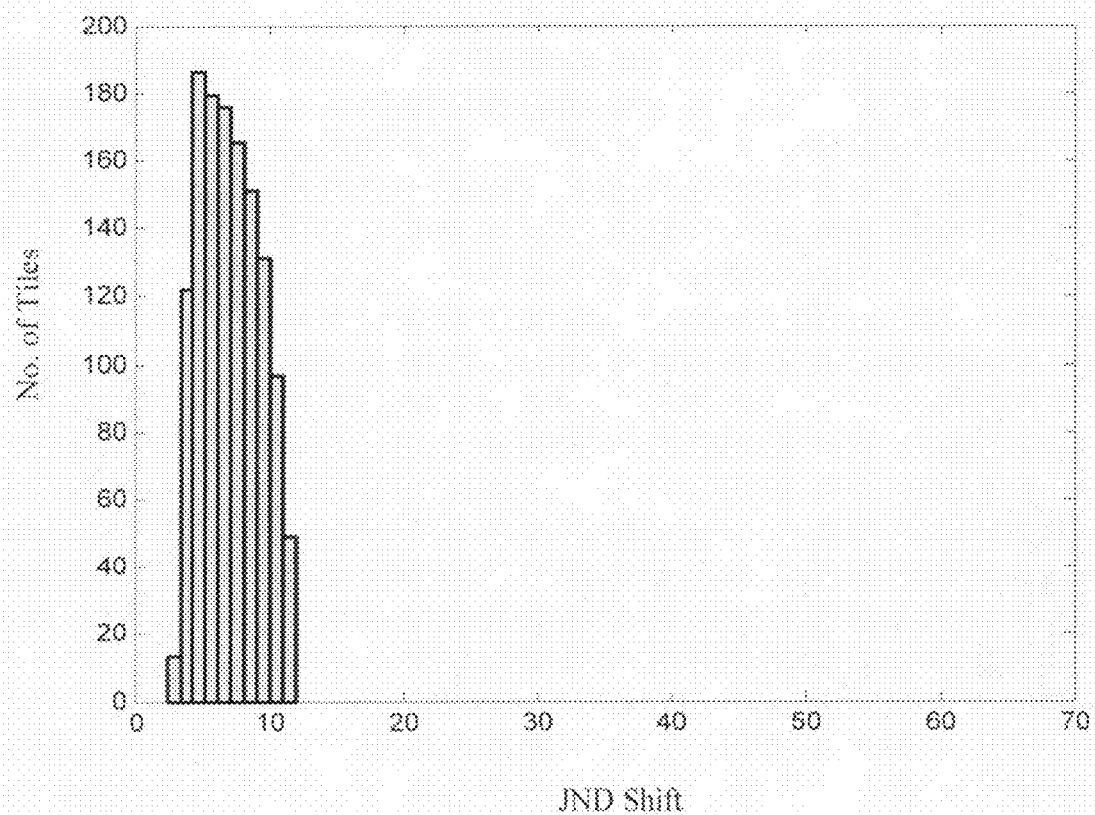
FIG. 11 shows a histogram of color shifts for a perylene-dyed substrate according to the present invention.

Embodiments of the present invention using perylene dye at two concentrations or the reflective filter described above may have substantially smaller color shifts than conventional devices whether measured as an average, minimum, or maximum distortion, as illustrated in Table II. FIG. 11 shows a histogram of color shifts for a perylene-dyed substrate according to the present invention whose transmission spectrum is shown in FIG. 6. Notably, the shift across all color tiles was observed to be substantially lower and narrower than those for conventional devices described by Mainster, Pratt, and the like. For example, simulation results showed (L*, a*, b*) shifts as low as 12 and 20 JNDs for films according to the present invention, with average shifts across all tiles as low as 7-12 JNDs.

Figure 14A:
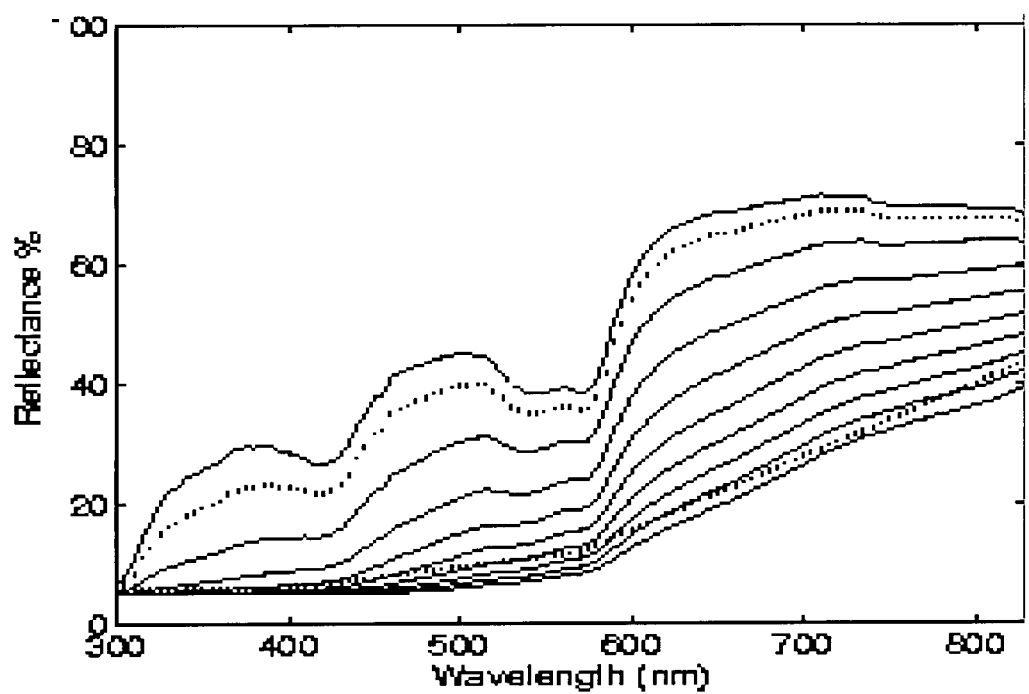
FIGS. 14A-14B show representative series of skin reflectance spectra from subjects of different races.
Figure 14B:
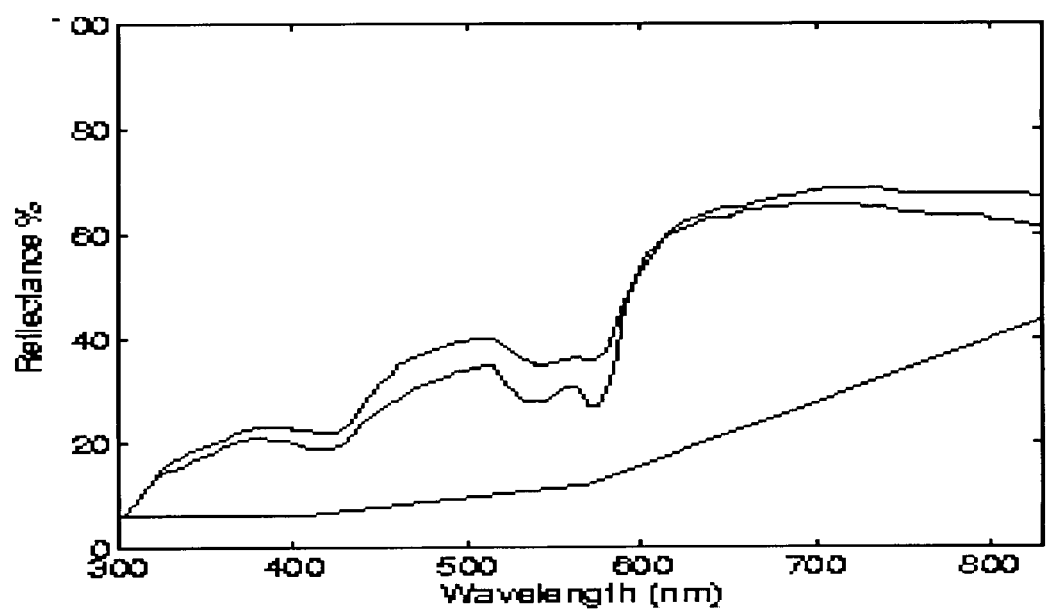
Figure 15:
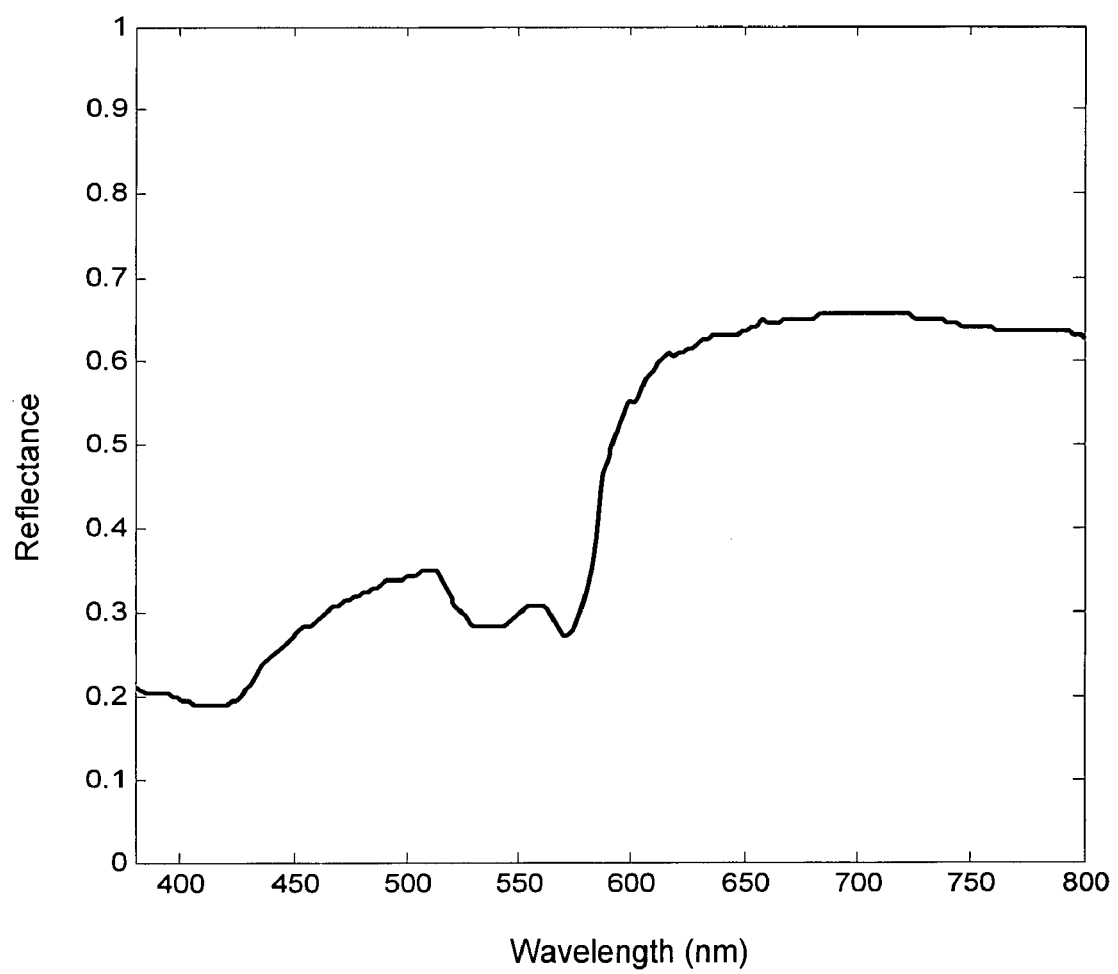
FIG. 15 shows an exemplary skin reflectance spectrum for a Caucasian subject.

When a traditional filter is used, the color of the wearer's face when viewed by an external observer may be tinted by the lens, i.e., the facial coloration or skin tone typically is shifted by a blue-blocking lens when viewed by another person. This yellow discoloration that accompanies blue light absorption is often not cosmetically desirable. The procedure for minimizing this color shift is identical to that described above for the Munsell tiles, with the reflectance of the wearer's skin being substituted for those of the Munsell color tiles. The color of skin is a function of pigmentation, blood flow, and the illumination conditions. A representative series of skin reflectance spectra from subjects of different races is shown in FIGS. 14A-B. An exemplary skin reflectance spectrum for a Caucasian subject is shown in FIG. 15. The (L*, a*, b*) color coordinates of this skin in daylight (D65) illumination are (67.1, 18.9, 13.7). Interposition of the Pratt blue-blocking filter changes these color coordinates to (38.9, 17.2, 44.0), a shift of 69 JND units. The Mainster blue-blocking filter shifts the color coordinates by 17 JND units to (62.9, 13.1, 29.3). By contrast, a perylene filter as described herein causes a color shift of only 6 JNDs, or one third that of the Mainster filter. A summary of the cosmetic color shift of an exemplary Caucasian skin under daylight illumination using various blue-blocking filters is shown in Table III. The data shown in Table I refer are normalized to remove any effect caused by a base material.

TABLE III

| Reference | Figure | L* | a* | b* | δ(L*, a*, b*) |
|---|---|---|---|---|---|
| Skin | 14-15 | 67 | 19 | 14 | 0 |
| Pratt | | 39 | 17 | 44 | 69 |
| Mainster | | 63 | 13 | 29 | 17 |
| Present System | 6 | 67 | 17 | 19 | 6 |
| Present System | 7 | 67 | 15 | 23 | 10 |
| Present System | 8 | 67 | 17 | 19 | 6 |

In an embodiment, an illuminant may be filtered to reduce but not eliminate the flux of blue light to the retina. This may be accomplished with absorptive or reflective elements

TABLE II

| Reference | Figure | Avg. δ (L*, a*, b*) | Min. δ (L*, a*, b*) | Max. δ (L*, a*, b*) | Std. Deviation δ (L*, a*, b*) |
|---|---|---|---|---|---|
| Pratt | | 41 | 19 | 66 | 12 |
| Mainster | | 19 | 6 | 34 | 6 |
| Present System | 6 | 7 | 2 | 12 | 2 |
| Present System | 7 | 12 | 4 | 20 | 3 |
| Present System | 8 | 7 | 2 | 12 | 2 |

Figure 12:
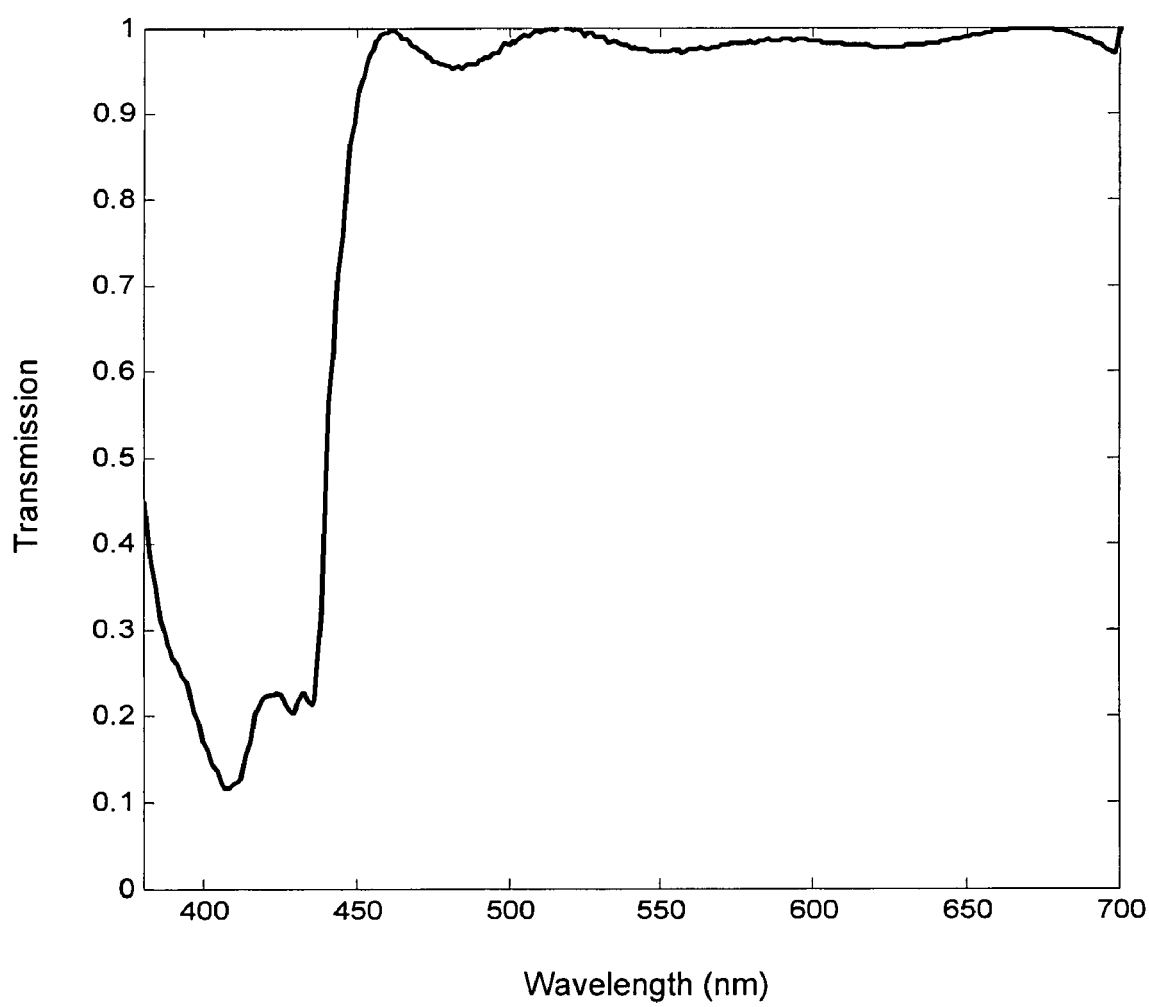
FIG. 12 shows the transmission spectrum of a system according to the present invention.

In an embodiment, a combination of reflective and absorptive elements may filter harmful blue photons while maintaining relatively high luminous transmission. This may allow a system according to the invention to avoid or reduce pupil dilation, preserve or prevent damage to night vision, and reduce color distortion. An example of this approach combines the dielectric stacks shown in FIG. 8 with the perylene dye of FIG. 6, resulting in the transmission spectrum shown in FIG. 12. The device was observed to have a photopic transmission of 97.5%, scotopic transmission of 93.2%, and an average color shift of 11 JNDs. The histogram summarizing color distortion of this device for the Munsell tiles in daylight is shown in FIG. 13.

In another embodiment, an ophthalmic filter is external to the eye, for example a spectacle lens, goggle, visor, or the like.

between the field of view and the source of illumination using the principles described herein. For example, an architectural window may be covered with a film that contains perylene so that the transmission spectrum of the window matches that shown in FIG. 6. Such a filter typically would not induce pupil dilation when compared to an uncoated window, nor would it cause appreciable color shifts when external daylight passes through it. Blue filters according to the present invention may be used on artificial illuminants such as fluorescent, incandescent, arc, flash, and diode lamps, displays, and the like.

Various materials may be used in making films according to the invention. Two such exemplary materials are Poly Vinyl Alcohol (PVA) and Poly Vinyl Butyral (PVB). In the case of PVA film it may be prepared by partial or complete hydrolysis of polyvinyl acetate to remove the acetate groups. PVA film may be desirable due to beneficial film forming, emulsifying, and adhesive properties. In addition, PVA film has high tensile strength, flexibility, high temperature stability, and provides an excellent oxygen barrier.

PVB film may be prepared from a reaction of polyvinyl alcohol in butanal. PVB may be suitable for applications that require high strength, optical clarity, flexibility and toughness. PVB also has excellent film forming and adhesive properties.

PVA, PVB, and other suitable films may be extruded, cast from a solution, spin coated and then cured, or dip coated and then cured. Other manufacturing methods known in the art also may be used. There are several ways of integrating the dyes needed to create the desired spectral profile of the film. Exemplary dye-integration methods include vapor deposition, chemically cross linked within the film, dissolved within small polymer micro-spheres and then integrated within the film. Suitable dyes are commercially available from companies including Keystone, BPI & Phantom.

Most dyeing of spectacle lenses is done after the lens has been shipped from the manufacturer. Therefore, it may be desirable to incorporate a blue-absorbing dye during the manufacture of the lens itself. To do so, the filtering and color balancing dyes may be incorporated into a hard coating and/or an associated primer coating which promotes adhesion of the hard coating to the lens material. For example, a primer coat and associated hard coat are often added to the top of a spectacle lens or other ophthalmic system at the end of the manufacturing process to provide additional durability and scratch resistance for the final product. The hard coat typically is an outer-most layer of the system, and may be placed on the front, back, or both the front and back surfaces of the system.

Figure 18:
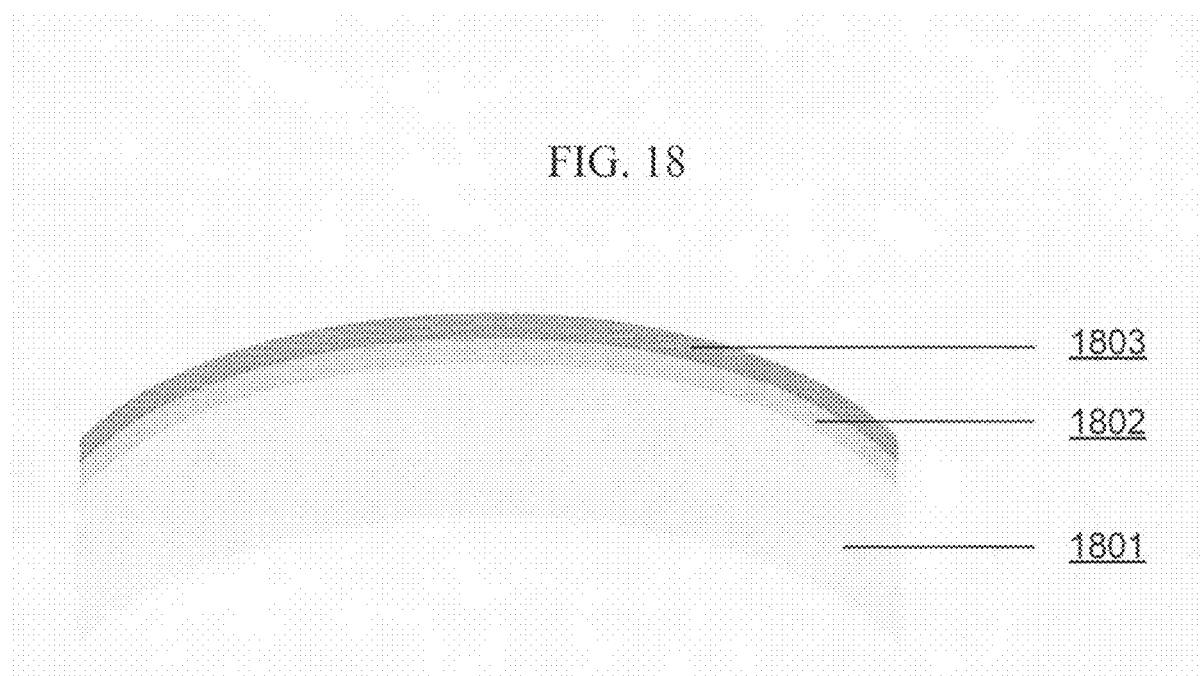
FIG. 18 shows an ophthalmic system having a hard coat according to the present invention.

FIG. 18 shows an exemplary system having a hard coating 1803 and its associated adhesion-promoting primer coat 1802. Exemplary hard coatings and adhesion promoting primer coating are available from manufacturers such as Tokuyama, UltraOptics, SDC, PPG, and LTI.

In systems according to the invention, both a blue blocking dye and a color balancing dye may be included in the primer coating 1802. Both the blue blocking and color balancing dyes also may be included in the hard coating 1803. The dyes need not be included in the same coating layer. For example, a blue blocking dye may be included in the hard coating 1803, and a color balancing dye included in the primer coating 1802. The color balancing dye may be included in the hard coating 1803 and the blue blocking dye in the primer coating 1802.

Primer and hard coats according to the invention may be deposited using methods known in the art, including spin-coating, dip-coating, spray-coating, evaporation, sputtering, and chemical vapor deposition. The blue blocking and/or color balancing dyes to be included in each layer may be deposited at the same time as the layer, such as where a dye is dissolved in a liquid coating material and the resulting mixture applied to the system. The dyes also may be deposited in a separate process or sub-process, such as where a dye is sprayed onto a surface before the coat is cured or dried or applied.

A hard coat and/or primer coat may perform functions and achieve benefits described herein with respect to a film. Specifically, the coat or coats may selectively inhibit blue light, while maintaining desirable photopic vision, scotopic vision, circadian rhythms, and phototoxicity levels. Hard coats and/or primer coats as described herein also may be used in an ophthalmic system incorporating a film as described herein, in any and various combinations. As a specific example, an ophthalmic system may include a film that selectively inhibits blue light and a hard coat that provides color correction.

EXPERIMENTAL

Figure 16:
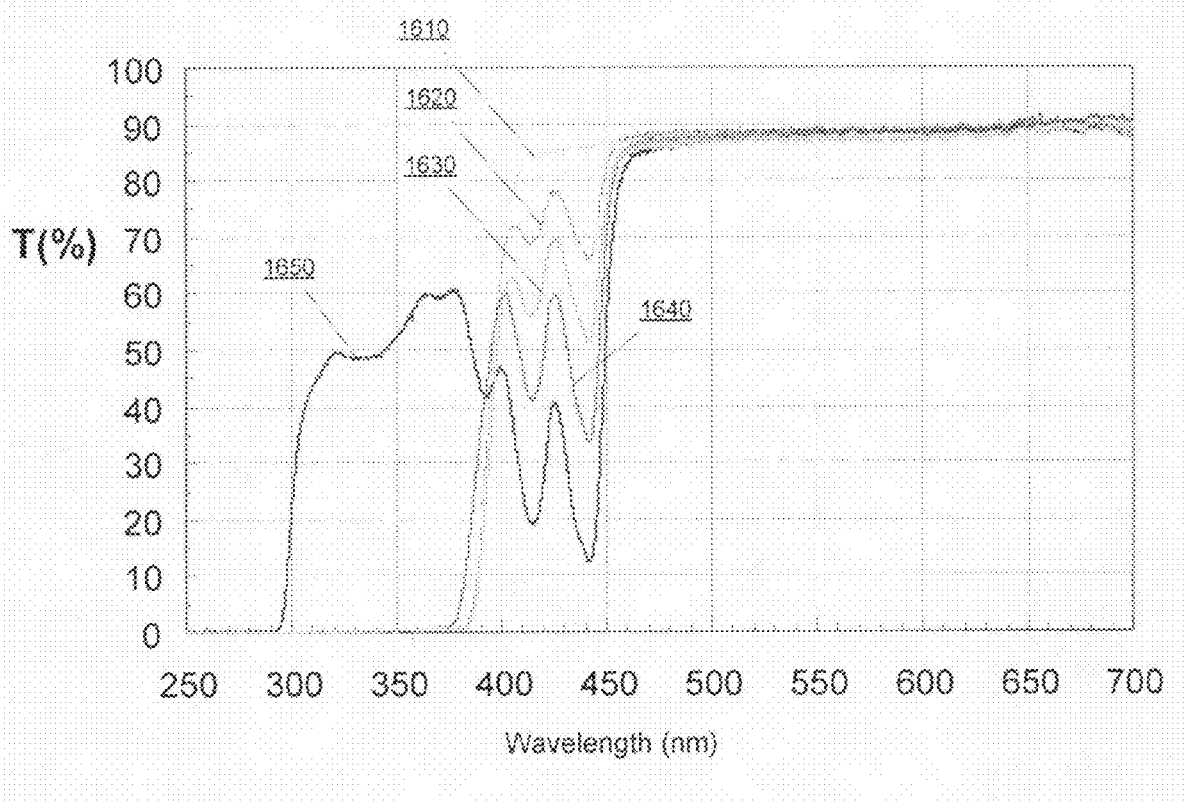
FIG. 16 shows transmission spectra for various lenses according to the present invention.

A polycarbonate lens having an integral film with varying concentrations of blue-blocking dye was fabricated and the transmission spectrum of each lens was measured as shown in FIG. 16. Perylene concentrations of 35, 15, 7.6, and 3.8 ppm (weight basis) at a lens thickness of 2.2 mm were used. Various metrics calculated for each lens are shown in Table IV, with references corresponding to the reference numerals in FIG. 16. Since the selective absorbance of light depends primarily on the product of the dye concentration and coating thickness according to Beer's law, it is believed that comparable results are achievable using a hard coat and/or primer coat in conjunction with or instead of a film.

TABLE IV

| Lens | Ref. | Photopic Ratio ($V_\lambda$) | Scotopic Ratio ($V'_\lambda$) | Circadian Ratio ($M'_\lambda$) | Phototoxicity Ratio ($B_\lambda$) |
|---|---|---|---|---|---|
| Unfiltered light (no lens) | | 100.0% | 100.0% | 100.0% | 100.0% |
| Polycarbonate Lens (no dye) | 1610 | 87.5% | 87.1% | 74.2% | 85.5% |
| 3.8 ppm (2.2 mm) | 1620 | 88.6% | 86.9% | 71.0% | 78.8% |
| 7.6 ppm (2.2 mm) | 1630 | 87.0% | 84.1% | 65.9% | 71.1% |
| 15 ppm (2.2 mm) | 1640 | 88.3% | 83.8% | 63.3% | 63.5% |
| 35 ppm (2.2 mm) | 1650 | 87.7% | 80.9% | 61.5% | 50.2% |

With the exception of the 35 ppm dyed lens, all the lenses described in Table IV and FIG. 16 include a UV dye typically used in ophthalmic lens systems to inhibit UV wavelengths below 380 nm. The photopic ratio describes normal vision, and is calculated as the integral of the filter transmission spectrum and $V_\lambda$ (photopic visual sensitivity) divided by the integral of unfiltered light and this same sensitivity curve. The scotopic ratio describes vision in dim lighting conditions, and is calculated as the integral of the filter transmission spectrum and $V'_\lambda$ (scotopic visual sensitivity) divided by the integral of unfiltered light and this same sensitivity curve. The circadian ratio describes the effect that a filter has on the suppression of melatonin, which may affect human circadian rhythms, and is calculated as the integral of the filter transmission spectrum and $M'_\lambda$ (melatonin suppression sensitivity) divided by the integral of unfiltered light and this same sensitivity curve. The phototoxicity ratio describes damage to the eye caused by exposure to high-energy light, and is calculated as the integral of the filter transmission and the $B_\lambda$ (phakic UV-blue phototoxicity) divided by the integral of unfiltered light and this same sensitivity curve. Response functions used to calculate these values correspond to those disclosed in Mainster and Sparrow, "How Much Blue Light Should an IOL Transmit?" Br. J. Opthalmol., 2003, v. 87, pp. 1523-29, Mainster, "Intraocular Lenses Should Block UV Radiation and Violet but not Blue Light," Arch. Ophthal., v. 123, p. 550 (2005), and Mainster, "Violet and Blue Light Blocking Intraocular Lenses: Photoprotection vs. Photoreception", Br. J. Opthalmol, 2006, v. 90, pp. 784-92. For some applications, a different phototoxicity curve is appropriate but the methodology for calculation is the same. For example, for intraocular lens (IOL) applications, the aphakic phototoxicity curve should be used. Moreover, new phototoxicity curves may be applicable as the understanding of the phototoxic light mechanisms improves.

As shown by the exemplary data described above, a system according to the present invention may selectively inhibit blue light, specifically light in the 400 nm-460 nm region, while still providing a photopic luminous transmission of at least about 85% and a phototoxicity ration of less than about 80%, more preferably less than about 70%, more preferably less than about 60%, and more preferably less than about 50%. As previously described, a photopic luminous transmission of up to 95% or more also may be achievable using the techniques described herein.

The principles described herein may be applied to varied illuminants, filters, and skin tones, with the objective of filtering some portion of phototoxic blue light while reducing pupil dilation, scotopic sensitivity, color distortion through the ophthalmic device, and cosmetic color of an external ophthalmic device from the perspective of an observer that views the person wearing the device on their face.

Although the methods and systems described herein have been described using examples of specific dyes, dielectric optical filters, skin tones, and illuminants, it will be understood that alternative dyes, filters, skin colors, and illuminants may be used.

What is claimed is:

1. An ophthalmic system comprising a film containing a dye that selectively inhibits light having a wavelength of 400 nm-460 nm; the film is interspaced between two ophthalmic lens layers; and wherein the system has a photopic luminous transmission of at least 85% across the visible spectrum and a phototoxicity ratio less than about 80%.

2. The ophthalmic system of claim 1 wherein the system has a phototoxicity ratio less than 70%.

3. The ophthalmic system of claim 1 wherein the system has a phototoxicity ratio less than 60%.

4. The ophthalmic system of claim 1 wherein the system has a phototoxicity ratio less than 50%.

5. The ophthalmic system of claim 1 wherein the system reduces scotopic luminous transmission by not more than 15%.

6. The ophthalmic system of claim 1 wherein the system has a circadian ratio greater than 60%.

7. The ophthalmic system of claim 1 further comprising a color-balancing component.

8. The ophthalmic system of claim 1 wherein the film comprises PVA.

9. The ophthalmic system of claim 1 wherein the maximum color shift under D65 illuminant of any Munsell Color System tile caused by the system is not more than 20 just noticeable difference (JND) units in the CIE (L*, a*, b*) color space.

10. An ophthalmic system comprising a film containing a dye that selectively inhibits light having a wavelength of 400 nm-460 nm; the film is interspaced between two ophthalmic lens layers; and wherein the system has a photopic luminous transmission of at least 85% across the visible spectrum and reduces scotopic luminous transmission by not more than 15%.

11. The ophthalmic system of claim 10 wherein the system has a photopic luminous transmission of at least 95% across the visible spectrum.

12. The ophthalmic system of claim 10 further comprising a color-balancing component.

13. The ophthalmic system of claim 10 wherein the film comprises PVA.

14. The ophthalmic system of claim 10 wherein the maximum color shift under D65 illumination of any Munsell Color System tile caused by the system is not more than about 20 just noticeable difference (JND) units in the CIE (L*, a*, b*) color space.

15. The ophthalmic system of claim 10 wherein the system has a phototoxicity ratio less than 80%.

16. The ophthalmic system of claim 10 wherein the system has a phototoxicity ratio less than 70%.

17. The ophthalmic system of claim 10 wherein the system has a phototoxicity ratio less than 60%.

18. The ophthalmic system of claim 10 wherein the system has a phototoxicity ratio less than 50%.

19. An ophthalmic system comprising: a film containing a dye that reduces but does not eliminate transmission of light having a wavelength of 400 nm-460 nm; a color-balancing component disposed adjacent to the film; and both the film and the color-balancing component are interspaced between two ophthalmic lens layers and wherein the system has a photopic luminous transmission of at least 85% and a phototoxicity ratio of less than 80%.

20. An ophthalmic system comprising a coating containing a dye that selectively inhibits light having a wavelength of 400 nm-460 nm; the coating is the outer-most layer of the system and is disposed on an outer surface of an ophthalmic lens layer; and wherein the system has a photopic luminous transmission of at least about 85% across the visible spectrum and a phototoxicity ratio less than 80%.

21. The ophthalmic system of claim 20 wherein the coating is a hard coat.

22. The ophthalmic system of claim 20 wherein the system reduces scotopic luminous transmission by not more than 15%.

23. The ophthalmic system of claim 1 wherein the film contains a dye from the group consisting of coumarin 6, coumarin 30, perylene, magnesium tetraphenyl porphyrin, yellow orange, and acridyne.

24. The ophthalmic system of claim 10 wherein the film contains a dye from the group consisting of coumarin 6, coumarin 30, perylene, magnesium tetraphenyl porphyrin, yellow orange, and acridyne.

25. The ophthalmic system of claim 19 wherein the film contains a dye from the group consisting of coumarin 6, coumarin 30, perylene, magnesium tetraphenyl porphyrin, yellow orange, and acridyne.

26. The ophthalmic system of claim 20 wherein the coating contains a dye from the group consisting of coumarin 6, coumarin 30, perylene, magnesium tetraphenyl porphyrin, yellow orange, and acridyne.

* * * * *